ALFRED RAYMOND & ALBERT RAYMOND.
INNER TUBE FOR PNEUMATIC TIRES.
APPLICATION FILED MAY 26, 1913.
1,065,836.
Patented June 24, 1913.
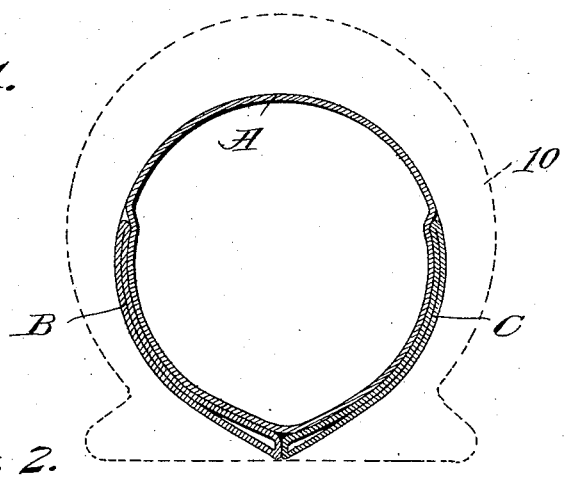
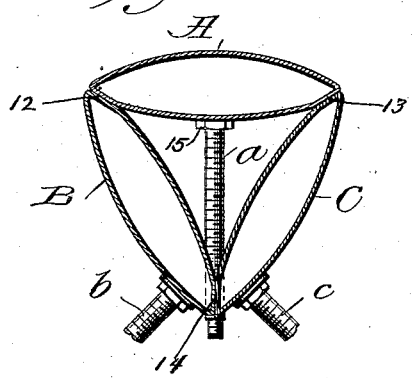
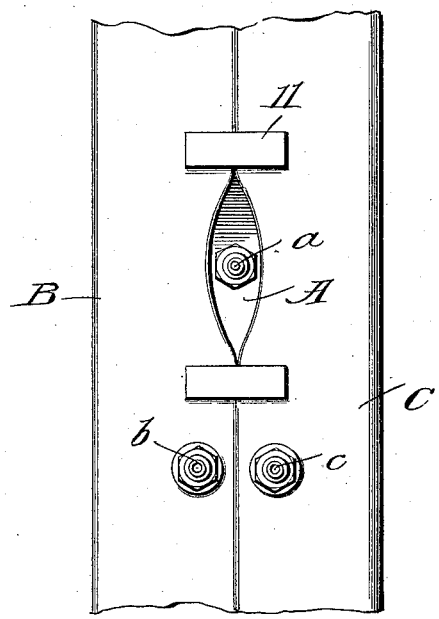
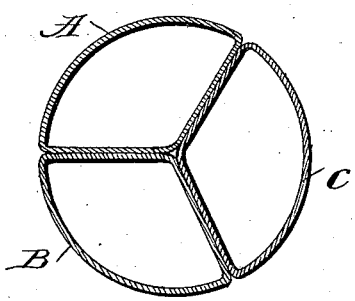

UNITED STATES PATENT OFFICE.

ALFRED RAYMOND AND ALBERT RAYMOND, OF WASHINGTON, DISTRICT OF COLUMBIA.

INNER TUBE FOR PNEUMATIC TIRES.

1,065,836.  Specification of Letters Patent.  Patented June 24, 1913.

Application filed May 26, 1913. Serial No. 769,867.

*To all whom it may concern:*

Be it known that we, ALFRED RAYMOND and ALBERT RAYMOND, citizens of the United States, residing at Washington, in the District of Columbia, have invented and discovered certain new and useful Improvements in Inner Tubes for Pneumatic Tires, of which the following is a specification.

Our invention consists in certain improvements in the form and arrangement of inner tube structures for pneumatic tires for vehicle wheels of that type comprising multiple chambers, or tubes, adapted for successive use, whereby when one chamber becomes punctured or disabled another may be quickly inflated and adapted to take its place in the tire without the trouble, delay, and expense of removing one tube and substituting another.

The particular object of our present invention is to provide such an inner tube structure so formed and arranged that when one tube or chamber is inflated and in use, the other tubes, or the walls of the other chambers, will fold smoothly and evenly over or partially around the inflated chamber, and also wherein, if at any time the several chambers, or more than one of them, should be used together the combined inflated or partially inflated chambers will present an evenly curved exterior and smooth abutting surfaces, all as will be hereinafter more fully described and claimed.

Referring to the accompanying drawings which are made a part hereof and on which similar reference characters indicate similar parts, Figure 1 is a cross section of an automobile tire provided with an inner tube structure of our improved form, showing one chamber or tube inflated and the others deflated and folded closely and smoothly against the inflated chamber, Fig. 2 a cross section through the inner tube structure showing the three sections of chambers deflated and illustrating the relative arrangement between them and points where they are secured together, Fig. 3 a section of the tube structure in elevation at the point where the air valves are connected, and Fig. 4 a view illustrating the form of the inner tube structure as if used with the three chambers inflated at one time.

It will be understood, of course, that the structure is primarily designed for use with one chamber inflated at a time, the other chambers being merely reserve chambers to be called into use when one of the other chambers becomes disabled or punctured. The illustration in Fig. 4 is merely to show that if for any reason it is found desirable the three chambers or tubes may be used together. Said inner tube structure is best illustrated in Fig. 2 and, as shown, comprises three separate tubes, A, B, and C, cemented together throughout their peripheries, at points near diametrically opposite lines, in the general form of a triangle, each tube being cemented at each attaching point securely to each of the other tubes at their respective attaching points indicated in Fig. 2 by the numerals 12, 13, and 14. The outside tube, or the tube which normally is adjacent to the tread of the tire or shoe 10, as the structure is arranged, must necessarily have an inflating connection extending between the other two tubes in order to have the air valve arranged for connection on the interior of the rim of the wheel as is usual. We have shown such a connection consisting of the stem *a* detachably connected with the central tube A, which extends between the adjacent edges of the tubes B and C and is adapted to extend through the rim of the wheel for connection with any ordinary air pump, or other inflating means, as is usual. Another air valve stem *b* is connected with tube B and another, *c*, with tube C, the several stems extending through the rim of the wheel and adapted to be connected in the ordinary manner with the inflating means. On each side of the opening between tubes B and C through which the valve stem *a* extends, we cement binding strips 11 to stay the opening from further elongation. Said valve stem *a* is detachable from the tube A, being screwed into a plate 15 cemented thereto, and tube A is thus designed to be the first used, the tubes B and C folding snugly and smoothly between said tube A and the shoe 10 of the tire. Upon tube A being punctured or otherwise injured valve stem *a* is unscrewed from its connection with the tube A, leaving said tube free to fold smoothly over the side of tube B or C which may be next inflated. It will be understood that said other tubes B and C may be used as desired, but that it is desirable to use tube A first for the reason above mentioned, as the stem *a* would interfere with the smooth folding of the tube A over either of said other tubes at the point of its connection if left attached. By reason of the tubes being securely cemented to each other along their contiguous edges, or the edges which when said tubes are flattened would be adjacent to diametrically opposite points, an endless chain of tubes if formed, by which arrangement the inflation of one tube will naturally draw the other tubes around the same so as to lie smoothly within the shoe and afford an additional cushion for the structure, but at the same time leave either always available for quick substitution for another tube in case of emergency.

In lieu of the tubes A, B, and C being united by cement, as described, it will be understood, of course, that any other uniting means found appropriate may be substituted, or that the entire structure may be formed of a single piece of material, as rubber.

Having thus fully described our said invention, what we claim as new, and desire to secure by Letters Patent is:—

1. An inner tube structure for pneumatic tires comprising a series of inflatable tubes attached to each other at points adjacent to diametrically opposite sides of each tube, one tube being so attached to the other tubes on each side thereof in said structure, and means for inflating said tubes successively, substantially as set forth.

2. An inner tube structure for pneumatic tires comprising three tubes connected together along their contiguous faces at points adjacent to diametrically opposite sides of each tube, the said tubes being each connected to each of the other tubes, and means for inflating the same successively, substantially as set forth.

3. An inner tube structure for pneumatic tires comprising a multiplicity of tubes connected together along contiguous edges, each tube being connected to a tube on each side thereof and each of said tubes being provided with an air valve stem, the stem of one tube extending between other tubes to the outside and being detachably secured, substantially as set forth.

4. An inner tube structure for pneumatic tires consisting of three or more collapsible tubes arranged in a continuous endless structure and connected one to the other at points adjacent to diametrically opposite sides of each tube, substantially as set forth.

In witness whereof, we have hereunto set our hands and seals at Washington, D. C., this 24th day of May, A. D., nineteen hundred and thirteen.

ALFRED RAYMOND. [L. S.]
ALBERT RAYMOND. [L. S.]

Witnesses:
E. W. BRADFORD,
T. A. BRADDOCK.

---

Copies of this patent may be obtained for five cents each, by addressing the "Commissioner of Patents, Washington, D. C."